United States Patent Office 3,080,747
Patented Mar. 12, 1963

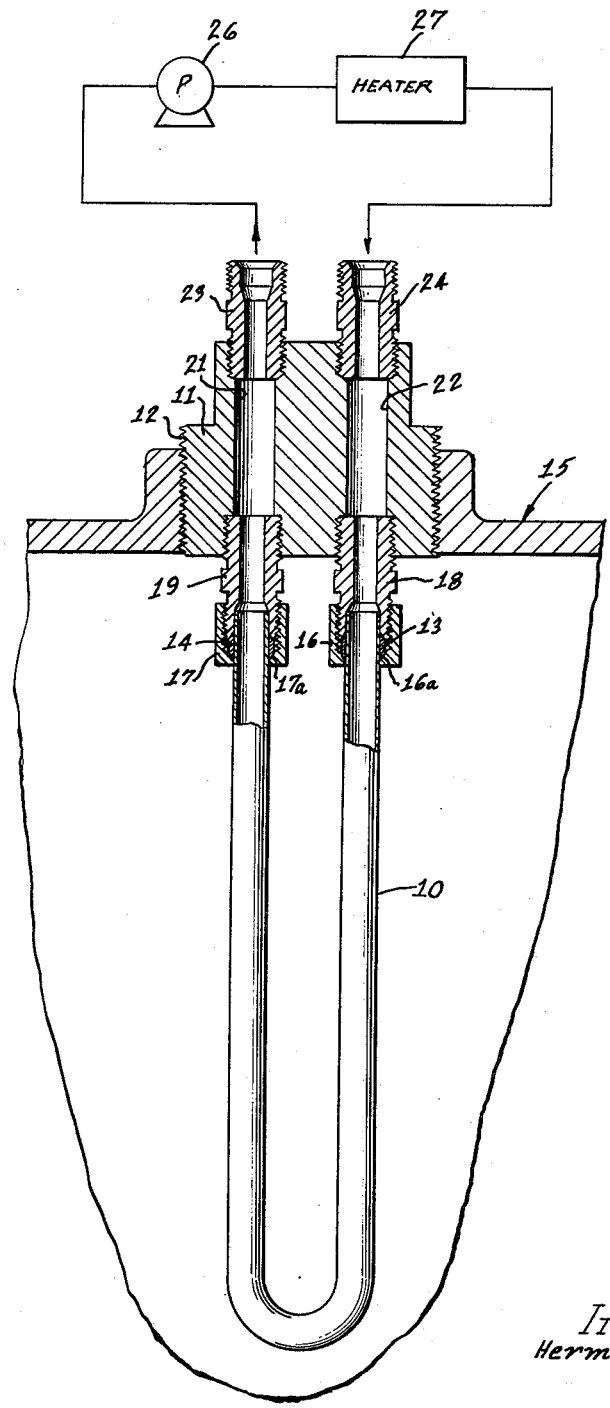

3,080,747
CORROSION TEST SPECIMEN
Herman Kerst, Des Plaines, Ill., assignor to Dearborn Chemical Company, Chicago, Ill., a corporation of Illinois
Filed Mar. 21, 1960, Ser. No. 16,424
1 Claim. (Cl. 73—53)

The present invention is directed to a method and apparatus for testing the corrosiveness and scale depositing tendencies of liquid systems.

The method and apparatus of the present invention find particular utility in the testing of cooling waters to determine their corrosive tendencies, their scale depositing tendencies, or the effectiveness of agents added to such systems to prevent corrosion and/or scale deposition.

The testing of circulating cooling waters has heretofore been considered essentially a laboratory technique. Various types of apparatus have been devised to simulate the conditions occurring in the plant. Such apparatus, for the most part, however, has been relatively fragile and cumbersome, or required a long period of time to secure even preliminary results.

One of the most widely used tests is the so-called static test in which coupons of steel are immersed in a water bath which is saturated with air and changed every 24 hours. This test is normally run for 14 days under quiescent conditions after which the specimens are cleaned to remove reaction products resulting from corrosion, dried, and then weighed to determine the weight loss resulting from corrosion.

Another common test is the so-called spinning disc method in which the test coupon is immersed in water, without aeration, and subjected to spinning for a period of about 24 hours. After this test period, the coupon is removed, cleaned, and weighed as in the static test.

Still another commonly used test is the dynamic flow test in which test coupons are placed in a reservoir and subjected to a constantly circulating stream of the test water for a period of 100 hours.

All of the above mentioned tests suffer from some difficulties. Only the dynamic flow test mentioned above in any way simulates the actual conditions occurring in a circulating water system. Even that test, however, does not provide for an evaluation of the corrosion and scale depositing tendencies of the water at various heat transfer rates which might occur in the plant.

With the foregoing in mind, an object of the present invention is to provide an improved apparatus for on the spot checking of corrosiveness of circulating water systems.

Still another object of the invention is to provide a rugged, but simple test apparatus for making evaluations of corrosiveness and scale forming tendencies in the field.

Another object of the invention is to make it possible to evaluate the effect of high metal temperatures and heat transfer rates on scale formation and corrosion in the presence of circulating water.

Still another object of the invention is to provide a system for field testing of corrosion and scale inhibitors which is sufficiently compact to be portable.

Another object of the present invention is to provide an improved test probe for measuring corrosion and scale depositing tendencies.

Still another object of the invention is to provide an improved method for checking the corrosiveness and scale forming tendencies of circulating liquid systems.

In accordance with the present invention, I provide an easily interchangeable test probe consisting of a piece of metal tubing, preferably shaped in a hairpin or U shape for immersion in the liquid being tested. The probe is received in fluid tight engagement with a support which holds the probe immersed in the liquid. Means are provided in the support for circulating a fluid in a closed system continuously through the tube. In operation, a suitable non-corrosive liquid is continuously passed through the tube at a predetermined temperature during the test period. At the conclusion of the test period, the probe is removed, cleaned, and weighed in order to determine the amount of metal which has been lost by the exposure to the corrosive fluid. In addition, the scale or other solids which builds up on the probe can be removed at the end of the test by dissolving in acid, and can be analyzed for their content of magnesium, calcium, iron, copper, sulfate, phosphate, and the like. This analysis provides a qualitative picture of the type of deposits which is encountered in the system, and some idea of the amount which forms.

With the system of the present invention, several advantages are realized. The entire unit is light-weight and small so that weight loss measurements can be readily made. The ability to circulate heated, controlled temperature fluids through the device makes it possible to provide a test at controllable high metal skin temperatures. The probe is small enough so that it can be used as a field probe for insertion in existing circulating water systems under the actual conditions existing in the system. A wide variety of non-corrosive liquids at various temperature ranges can be pumped through the tube, thus simulating conditions of various heat transfer rates. Furthermore, probes of this type can be inserted in water systems containing water at various temperatures, flow rates, pH values, and other variables. Furthermore, the form and shape of the probe comes closer to reproducing actual field conditions in a small sized probe than any other type of analytical specimen commonly in use today.

Probes of the type described can also be used with condensing vapors in order to study this type of heat transfer, provided that the condensing material is noncorrosive to the inside of the probe.

A further description of the present invention will be made in conjunction with the attached sheet of drawings which illustrates the preferred embodiment of the invention. The single FIGURE in the drawings illustrates, partly in schematic form, a system for evaluating corrosive and scale forming tendencies in a circulating water system.

As shown on the drawings:

Reference numeral 10 indicates generally a piece of seamless metal tubing bent into a hairpin or U shape. While normally the tube 10 will be composed of steel, it is, of course, possible to make the tube of other materials whose behavior in the system is to be studied. Purely by way of example, a suitable test probe can be made by taking a length of seamless steel tubing having an outer diameter of ¼" and a length of about 13 inches, and bending it on about a ⅞" radius. The ends of the tube 10 are received in fluid tight engagement with a support such as a standard solid plug 11 having peripheral threads 12 arranged to be received, for example, in a support generally indicated at numeral 15 in the drawings. The fluid tight connection between the tube 10 and the plug 11 is provided by means of a compression fitting consisting of a pair of resilient sleeves 13 and 14, preferably made of a material such as polytetrafluoroethylene ("Teflon") which snugly engage the ends of the tube 10 and a pair of nuts 16 and 17 which are in threaded engagement with bushings 18 and 19 respectively. The bushings 18 and 19, in turn, are threaded into the ends of axially extending passages 21 and 22 in the plug 11. The nuts 16 and 17 have beveled edges 16a and 17a, respectively which press against the sleeves 13 and 14 to deform the sleeves and provide a tight sealing engagement.

A pair of bushings 23 and 24 are threaded into the opposite ends of the passages 21 and 22 in the plug 11 for receiving conduits which circulate the fluid through the tube 10 during the test period.

The circulating fluid is directed through the test probe by means of a pump 26 and the fluid is heated to a predetermined temperature by means of a heater 27 preferably of the electrical type.

The fluid circulated through the tube 10 should be non-corrosive to the metal of which the tube is composed. For general usage, materials such as polyoxyalkylene ethers sold commercially under the name "Ucons" are particularly suitable. For higher temperature work, commercial heat exchange composition such as a mixture of diphenyl and diphenyl oxide may also be employed.

In making the test, the probe 10 is first weighed and then inserted into its support. The non-corrosive fluid is circulated through the tube 10 at the predetermined temperature to which the heater 27 has been set. The outside of the tube 10 is exposed by immersion to the circulating water at whatever temperature and other conditions to be tested. At the conclusion of the test period, the tube 10 is removed and examined for the type of scale deposit which has been formed upon it. Any scale deposits built up on the tube can be removed by acid and further analyzed.

For corrosion testing, the tube 10 may be cleaned upon its removal from the system and weighed to determine the amount of metal that has been lost by exposure to the corrosive conditions. With a test system of this type, a reasonably accurate determination of corrosive conditions can be made within a relatively short interval of time, normally less than a day, to secure a quick evaluation of the condition of the fluid circulating system.

It will be evident that various modifications can be made to the described embodiment thereof without departing from the scope of the present invention.

I claim as my invention:

A portable test apparatus for testing the corrosiveness and scale forming tendencies of a liquid circulating system, comprising, means forming a closed hydraulic circuit for circulating a supply of non-corrosive liquid, a pump at one point in the circuit for driving the liquid in the form of a stream, a heat exchange means at a second point in the circuit to temperature condition the liquid in the stream, and a removable test probe insertable in the circuit at a third point in the circuit comprising a tubular element shaped in the configuration of a U with a bight portion and parallel spaced legs, each leg having coupling means for connecting the probe in said circuit, said legs and said bight portion being adapted to be inserted into a liquid system for a test period.

References Cited in the file of this patent

UNITED STATES PATENTS

| | | |
|---|---|---|
| 2,015,249 | Benesh | Sept. 24, 1935 |
| 2,484,279 | Folz | Oct. 11, 1949 |
| 2,669,865 | Cole et al. | Feb. 23, 1954 |
| 2,864,925 | Ellison | Dec. 16, 1958 |
| 2,931,219 | Moorman et al. | Apr. 5, 1960 |